United States Patent Office 3,040,536
Patented June 26, 1962

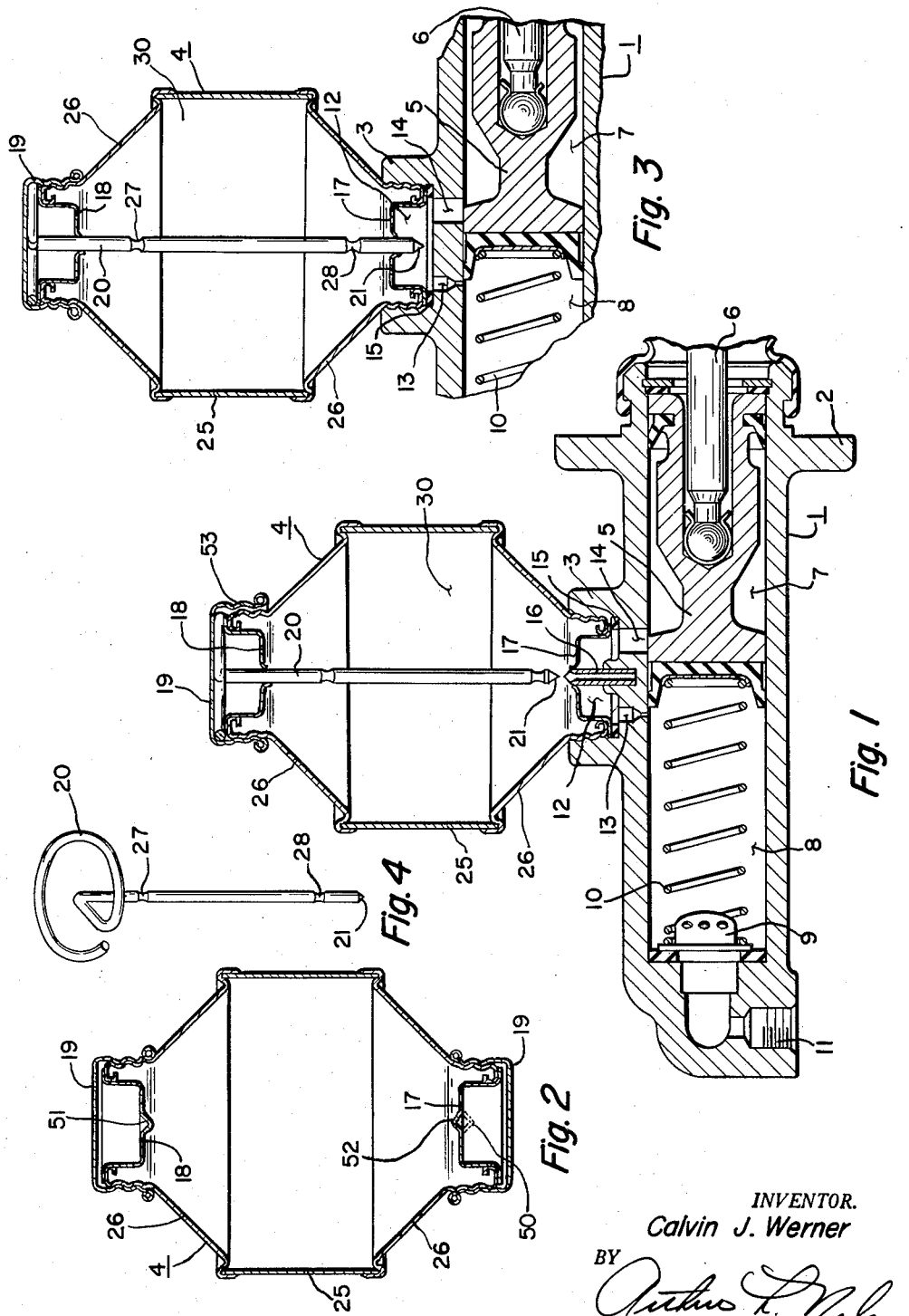

3,040,536
BRAKE FLUID RESERVOIR
Calvin J. Werner, Dayton, Ohio, assignor to General Motors Corporation, Detroit, Mich., a corporation of Delaware
Filed Nov. 23, 1959, Ser. No. 854,635
4 Claims. (Cl. 60—54.6)

This invention relates to a vehicle brake and more particularly to a removable reservoir for operation with a master cylinder in a hydraulic fluid brake actuating system.

In the conventional fluid brake system, the reservoir and the master cylinder are formed in a unitary cast. The fluid within the hydraulic fluid brake actuating system is depleted thereby requiring that fluid be added to the system from time to time. The fluid added is usually supplied in bulk quantities and the quality is seldom known by the operator of the vehicle.

Accordingly, this invention is intended to provide a removable reservoir for mounting on the master cylinder. The reservoir may be carried as a spare in the motor vehicle so that it is available at any time when it may be needed. This provides a fluid of a known quality, labeled accordingly, which is readily available to the operator of the vehicle. The manner in which the reservoir is removed and replaced reduces the chance for dirt entering the brake fluid system at the time the reservoir is being changed.

It is an object of this invention to provide a container which is removable and serves as a reservoir for the master cylinder in the hydraulic brake fluid actuating system.

It is another object of this invention to provide a removable reservoir in the form of a container which may be made of any desired size for replenishing fluid in the hydraulic fluid brake actuating system.

It is a further object of this invention to provide a sealed reservoir which is automatically opened when installed upon the master cylinder.

It is a further object of this invention to provide a means for piercing the reservoir through the use of a measuring rod which is seated within the reservoir when the reservoir is installed on the master cylinder.

The objects of this invention are accomplished by providing a metal container which is threaded for fastening to the master cylinder. The container is filled and sealed at the factory. The reservoirs may be shipped in any quantity or in any size to the point of destination where the reservoirs are needed. In this manner, the reservoir provides a sealed means containing a known quality and quantity of fluid readily available to the customer.

As the reservoir is placed on the master cylinder, the lower end of the container is pierced thereby permitting the fluid to flow into the hydraulic brake fluid system. The upper end of the reservoir is then pierced by a measuring rod which is contained within a cover. The cover is then threaded onto the upper end of the reservoir. The cover is also formed with a portion of its threads grooved axially to provide a venting means for the reservoir. In this manner, a fresh supply of fluid is supplied for the hydraulic fluid brake actuating system.

Further objects and advantages of the present invention will be apparent from the following description, reference being had to the accompanying drawings wherein preferred embodiments of the present invention are clearly shown.

In the drawings:

FIGURE 1 is a cross section view of the master cylinder which provides the mounting means for the replaceable reservoir.

FIGURE 2 is a cross section view of the container itself which is ready for shipment.

FIGURE 3 is a cross section view of a modified version wherein the measuring rod provides the means for piercing the reservoir for venting and also placing the fluid in communication with the master cylinder.

FIGURE 4 is a three-dimensional view of the measuring rod.

FIGURE 1 shows a cross section view of the replaceable reservoir mounted on the master cylinder. The master cylinder 1 is provided with a mounting flange 2, and a boss 3 for receiving the removable reservoir 4. The master cylinder receives the master piston 5 and is operated by a push rod 6 through manual means. The chamber 7 is formed behind the master piston 5 and the pressurizing chamber 8 is formed forward of the master piston 5. A check valve assembly 9 is mounted in the forward end of the master piston and is seated in this position by the compressing force of the spring 10. The port 11 leads to a plurality of vehicle wheel cylinders not shown.

The chamber 12 is in communication with the chamber 8 through the passage 13. The chamber 12 is also in communication with the chamber 7 by the port 14.

The replaceable reservoir 4 is threadedly fastened to the inner periphery of the boss 3. The lower portion of the reservoir 4 mounts on a seal 15 to prevent leakage of the fluid between the reservoir 4 and the boss 3. Centrally located within the boss 3 is a needle 16 with the sharp edge extending upwardly into the reservoir 4.

As the reservoir 4 is mounted within the boss 3, it is screwed downwardly to pierce the end plate 17 in the recess 52.

A similar end plate 18 is mounted in the opposite end of the container or reservoir 4. Both of these end plates 17 and 18 are pressed into the end of the container 4 and may be sealed by soldering or by a firm fit in pressing them into the end of the container 4. The cap 19 receives the measuring rod 20 before it is seated into the end of the container 4. A centering recess 51 is provided in the end plate 18 to locate the point 21 of the measuring rod 20 as it is inserted into the end plate 18. Once the measuring rod 20 is forced through the end plate 18, it then threadedly engages the outer periphery of the upper end of the reservoir 4.

Referring to FIGURE 2, the reservoir or container 4 is shown in cross section in the manner in which it is shipped from the point of supply to the point of service. The length of the central drum portion 25 may be extended to accommodate more fluid or the diameter of the drum section 25 may be also increased to provide greater capacity of the reservoir.

The cone sections 26 are fastened to the drum section 25 and provide a means for tapering the container to the convenient diameter for reception within the boss 3 and receiving the end cap 19.

FIGURE 4 shows a three-dimensional view of the measuring rod 20. The measuring rod 20 is constructed of a spring steel and inserts within the cap 19 before the cap is mounted on the upper end of the reservoir 4. The measuring rod has two annular recesses 27 and 28 to indicate the relative level of the fluid within the reservoir. The lower recess 28 indicates when the fluid within the reservoir is at a low point which may endanger the operation of the hydraulic fluid braking system.

The measuring rod length may be increased to puncture both ends of the plates 17 and 18 within the reservoir. The modification employing the longer length of the measuring rod 20 is illustrated in FIGURE 3.

FIGURE 3 illustrates the reservoir 4 mounted within boss 3 of the master cylinder 1. The reservoir 4 threadedly engages the inner periphery of the boss 3 and firmly seats on the seal 15. Once the reservoir 4 is mounted in its fixed position within the boss 3, the measuring rod 20 which is within the cap 19, is then inserted in the plate 18 to puncture this plate. The rod 20 then is forced downwardly to puncture the end plate 17 to provide communication between the reservoir 30 and the chamber 12 within the boss 3. The phantom view of the centering recess 50 is for puncturing from the inside of the container. In this manner, the reservoir 4 is firmly seated within the boss 3 before the seal is broken on the reservoir. This eliminates any possibility of leakage of fluid in replacing the container 4 with the fresh supply of fluid.

FIGURE 2 illustrates the container 4 which is available for shipment from the source of supply to the point of service. The container 4 is sealed on one end and then filled to the desired level and then sealed on the opposite end. The caps 19 on both ends of the container 4 provide added insurance that no leakage occurs during shipment of the container 4.

FIGURE 1 illustrates the reservoir or container 4 in its installed position on the vehicle hydraulic fluid system. The rod 20 indicates the level within the container. When the level is dangerously low, the container 4 is unthreaded from the boss 3 and may be discarded. The measuring rod 20, however, is not discarded. This is retained for use in the new reservoir which is installed. As the new reservoir is installed, it threadedly engages the inner periphery of the boss 3. As the threading movement of the container 4 moves the container downward, the needle 16 pierces the end plate 17. This places the chamber 30 in communication with the chamber 12 and provides a fresh supply of fluid for the master cylinder 1.

The cover 19 receives the measuring rod 20 and is inserted in a centering recess 51 within the end plate 18. The measuring rod 20 is then forced downwardly piercing the end plate 18. In this manner, a vent is provided on the upper end of the container 4.

The vent 53 is shown by a deformed portion of the threads on the cap 19 which permits air to enter as the fluid is depleted within the hydraulic brake fluid system.

FIGURE 3 is a modification of the version illustrated in FIGURE 1. The replacement of the container 4 is the same as that illustrated in FIGURE 1; however, in replacing the container 4 the plate 17 is not pierced by the needle 16. The container 4 is mounted within its position and then the measuring rod 20 is inserted in the recess 51 of the end plate 18. This punctures the end plate 18 and the downward movement of the measuring rod 20 pierces the end plate 17 in recess 50 to provide communication between the chamber 30 and chamber 12. This modification somewhat simplifies the structure of the boss 3 by eliminating the needle 16.

This type of reservoir provides a means for replenishing the fluid within the hydraulic brake fluid system. It assures the operator of a fresh supply of good quality hydraulic being placed within the hydraulic fluid brake system. It also provides a means for conveniently carrying an additional container of brake fluid to have available at any time it may be necessary.

While the embodiments of the present invention as herein disclosed constitute preferred forms, it is to be understood that other forms might be adopted.

What is claimed is as follows:

1. A replaceable fluid reservoir for use with means utilizing fluid therefrom and comprising, a fluid container separably mountable on said fluid utilizing means and having upper and lower sealed ends and a vent cover for said upper sealed end, sealing means for sealing said lower sealed end to said fluid utilizing means, means for puncturing said sealed ends to provide fluid communication between said container and said fluid utilizing means when said lower end is sealed to said fluid utilizing means by said sealing means and to provide a venting aperture in said upper sealed end, and a gauge rod adapted to extend through said venting aperture and to be held in fluid level gauging position in said container by said cover, said gauge rod further being at least a part of said puncturing means.

2. The reservoir of claim 1, said gauge rod being the entire puncturing means.

3. The reservoir of claim 1, said gauge rod being the portion of said puncturing means for puncturing said upper sealed end, said fluid utilizing means having a puncture member extending therefrom within said sealing means to engage and puncture said lower sealing end when said container is being mounted on and sealed to said fluid utilizing means.

4. A replaceable reservoir for a hydraulic fluid brake actuating system comprising in combination, a master cylinder, a container forming a reservoir and having fastening means on the lower end thereof for fastening to said master cylinder and a threaded portion on the upper end thereof, a cover member having a mating threaded portion for fastening said cover member to the upper end of said container, and a gauge rod mounted on said cover member and having a sharp portion for forming a container vent and a fluid communication aperture to said master cylinder by piercing the upper and lower ends of said container, said cover member having a deformed portion in the threaded portion thereof to provide, in cooperation with the pierce-formed container vent, venting means to permit fluid flow from said container to said master cylinder when said container is fastened to said master cylinder.

References Cited in the file of this patent

UNITED STATES PATENTS

| | | |
|---|---|---|
| 2,084,973 | John | June 22, 1937 |
| 2,305,204 | Smith | Dec. 15, 1942 |
| 2,755,629 | Baisch | July 24, 1956 |

FOREIGN PATENTS

| | | |
|---|---|---|
| 773,063 | Great Britain | Apr. 17, 1957 |